United States Patent
Girado et al.

(10) Patent No.: US 9,659,341 B2
(45) Date of Patent: May 23, 2017

(54) TEXTURE PIPE AS AN IMAGE PROCESSING ENGINE

(71) Applicant: QUALCOMM Incorporated, San Diego, CA (US)

(72) Inventors: Javier Ignacio Girado, San Diego, CA (US); Jay Chunsup Yun, Carlsbad, CA (US); Vineet Goel, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/749,430

(22) Filed: Jun. 24, 2015

(65) Prior Publication Data

US 2015/0379676 A1 Dec. 31, 2015

Related U.S. Application Data (60) Provisional application No. 62/016,967, filed on Jun. 25, 2014.

(51) Int. Cl.
| | | |
|---|---|---|
| G06F 15/00 | (2006.01) | |
| G06T 1/20 | (2006.01) | |
| G06T 7/40 | (2017.01) | |
| G06T 15/04 | (2011.01) | |
| G06T 15/80 | (2011.01) | |

(52) U.S. Cl.
CPC .............. *G06T 1/20* (2013.01); *G06T 7/40* (2013.01); *G06T 15/04* (2013.01); *G06T 15/80* (2013.01); *G06T 2200/28* (2013.01); *G06T 2207/20036* (2013.01)

(58) Field of Classification Search
None
See application file for complete search history.

(56) References Cited

U.S. PATENT DOCUMENTS

| | | | | |
|---|---|---|---|---|
| 2005/0237335 | A1* | 10/2005 | Koguchi | H04N 19/43 345/582 |
| 2007/0279434 | A1* | 12/2007 | Fujita | G06T 15/04 345/611 |
| 2010/0103180 | A1* | 4/2010 | Tamaoki | G06T 1/20 345/522 |
| 2013/0106889 | A1 | 5/2013 | Lee et al. | |

OTHER PUBLICATIONS

International Search Report and Written Opinion from International Application No. PCT/US2015/037773, dated Nov. 17, 2015, 14 pp.
Kelly et al., "Fast Image Interpolation for Motion Estimation using Graphics Hardware," Real Time Imaging VIII, SPIE, 2004, XP002659912, pp. 184-194.

(Continued)

*Primary Examiner* — Martin Mushambo
(74) *Attorney, Agent, or Firm* — Shumaker & Sieffert, P.A.

(57) ABSTRACT

A texture pipe of a graphics processing unit (GPU) may receive a texture data. The texture pipe may perform a block-based operation on the texture data, wherein the texture data comprises one or more blocks of texels. Shader processors of the GPU may process graphics data concurrently with the texture pipe performing the block-based operation. The texture pipe may output a result of performing the block-based operation on the one or more texture data.

29 Claims, 6 Drawing Sheets

(56) References Cited

OTHER PUBLICATIONS

Steen, "Utilizing texture units for Image Processing," May 2011, XP055222013, Retrieved from the Internet: URL: http://www.nvidia.de/content/PDF/isc-2011/Steen.pdf [retrieved on Oct. 19, 2015], 27 pp.

"Technical Brief NVIDIA GeForce 8800 GPU Architecture Overview," Nov. 8, 2006; XP055221986, Retrieved from the Internet: URL: www.nvidia.com/object/io_37100.html [retrieved on Oct. 12, 2015] Section Decoupled Shader Math and Texture Operations; 54 pp.

"Texture Tiling and Swizzling", The ryg blog, Jan. 17, 2011, 10 pp., XP055282055, Retrieved from Internet: URL: https://fgiesen.wordpress.com/2011/01/17/texture-tiling-and swizzling/ [retrieved on Jun. 20, 2016].

Response to Written Opinion dated Nov. 17, 2015, from International Application No. PCT/US2015/037773, filed on Apr. 25, 2016, 3 pp.

Second Written Opinion from International Application No. PCT/US2015/037773, dated Jul. 5, 2016, 5 pp.

Response to Second Written Opinion dated Jul. 5, 2016, from International Application No. PCT/US2015/037773, filed on Sep. 1, 2016, 16 pp.

International Preliminary Report on Patentability from International Application No. PCT/US2015/037773, dated Oct. 5, 2016, 9 pp.

\* cited by examiner

TEXTURE PIPE AS AN IMAGE PROCESSING ENGINE

This application claims priority to U.S. Provisional Patent Application No. 62/016,967 filed Jun. 25, 2014, the entirety of which is incorporated by reference herein.

TECHNICAL FIELD

The present disclosure relates to using a texture pipe for image processing.

BACKGROUND

Block-based image processing operations may be useful in processing image data. For example, convolution and correlation operations may be useful for performing image filtering, such as BOX, Gaussian, edge detection, Laplacian, down-sampling, mean, high/low pass, correlation, and the like. These operations may typically be performed by shader processors of a graphics processing unit (GPU).

SUMMARY

In general, the present disclosure relates to using a texture pipe as an image processing engine such that the texture pipe may be able to perform generic block-based operations such as convolutions, sums of absolute differences, and the like. The texture pipe may be able to perform these operations concurrently while the shader processor executes other instructions. In this way, the GPU may accelerate commonly-used image processing functions.

In one example, the present disclosure is directed to a method. The method may include receiving, by a texture pipe of a graphics processing unit (GPU), texture data. The method may further include performing, by the texture pipe, a block-based operation on the texture data, wherein the texture data comprises one or more blocks of texels. The method may further include processing graphics data with shader processors of the GPU concurrently with the texture pipe performing the block-based operation. The method may further include outputting, by the texture pipe, a result of performing the block-based operation on the texture data.

In another example, the present disclosure is directed to a computing device. The computing device may include a memory configured to store texture data. The computing device may further include a texture pipe configured to: receive texture data from the memory; perform a block-based operation on the texture data, wherein the texture data comprises one or more blocks of texels; and output a result of performing the one or more block-based operations on the one or more texture data. The computing device may further include shader processors configured to process graphics data concurrently with the texture pipe performing the block-based operation.

In another example, the present disclosure is directed to a non-transitory computer-readable medium containing instructions. The instructions cause a programmable processor to: receive, by a texture pipe of a GPU, texture data; perform, by the texture pipe, a block-based operation on the texture data, wherein each of the one or more texture data comprises one or more blocks of texels; process graphics data with shader processors of the GPU concurrently with the texture pipe performing the block-based operation; and output, by the texture pipe, a result of performing the one or more block-based operations on the one or more texture data.

In another example, the present disclosure is directed to an apparatus. The apparatus may include means for receiving texture data. The apparatus may further include means for performing a block-based operation on the texture data, wherein the texture data comprises one or more blocks of texels. The apparatus may further include means for processing graphics data concurrently with the means for performing the block-based operation. The apparatus may further include means for outputting a result of performing the block-based operation on the one or more texture data.

The details of one or more aspects of the present disclosure are set forth in the accompanying drawings and the description below. Other features, objects, and advantages of the present disclosure will be apparent from the description and drawings, and from the claims.

DETAILED DESCRIPTION

In general, the present disclosure relates to using a texture pipe on a GPU as an image processing engine such that the texture pipe may be configured to perform generic block-based operations such as convolutions, sums of absolute differences, and the like to process graphics data, thereby leveraging the texture pipe to enhance the performance of image processing performed by the GPU. Block-based operations may be operations that operate on blocks of graphics data. For example, a block may comprise one or more texels, and block-based operations may operate on the one or more texels of a block. Block-based operations may include block-to-block operations. Block-to-block operations may include applying an arithmetic operation between two independent blocks of the same size that may or may not have overlapping regions. Block to block based operations may include operations on a single block, such as computing the sum of all values of the pixels in the block, the mean of all values of the pixels in the block, and the like. Such block to block based operations may be useful in the context of image processing. Currently, these operations may mostly be performed by shader processors of a GPU. However, the performance of the GPU can be increased by off-loading these operations from the shader processors to a texture pipe of the GPU. The texture pipe may be able to perform these operations concurrently while the shader processor is busy executing instructions other than instructions for the block-based operations on the one or more texture data. For example, the shader processor may execute instructions to process graphics data while the texture pipe performs blockto-block operations. In this way, the GPU may accelerate commonly-used image processing functions.

Figure 1:
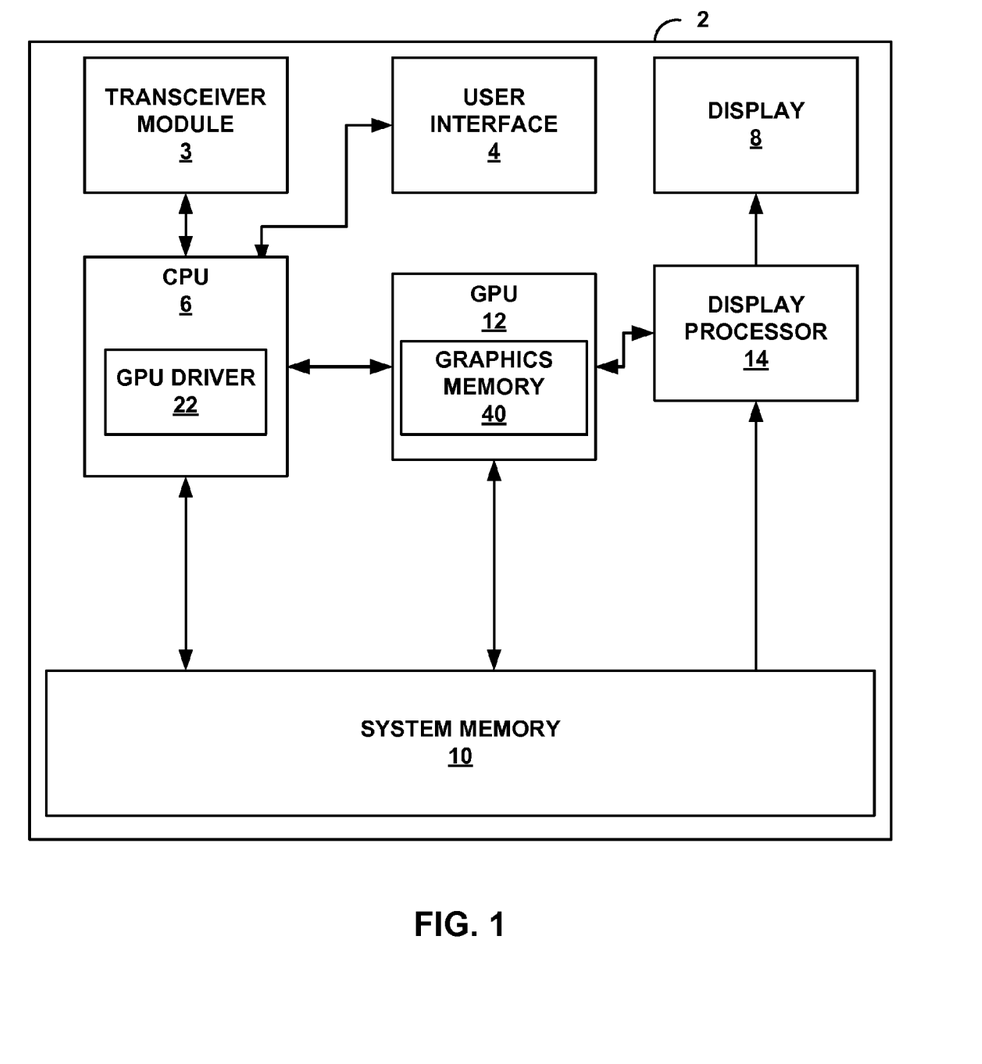
FIG. 1 is a block diagram illustrating an example computing device that may be configured to implement one or more aspects of this disclosure.

FIG. 1 is a block diagram illustrating an example computing device that may be configured to implement one or more aspects of this disclosure. As shown in FIG. 1, computing device 2 may be a computing device including but not limited to video devices, media players, set-top boxes, wireless handsets such as mobile telephones and so-called smartphones, personal digital assistants (PDAs), desktop computers, laptop computers, gaming consoles, video conferencing units, tablet computing devices, and the like. In the example of FIG. 1, computing device 2 may include central processing unit (CPU) 6, system memory 10, and GPU 12. Computing device 2 may also include display processor 14, transceiver module 3, user interface 4, and display 8. Transceiver module 3 and display processor 14 may both be part of the same integrated circuit (IC) as CPU 6 and/or GPU 12, may both be external to the IC or ICs that include CPU 6 and/or GPU 12, or may be formed in the IC that is external to the IC that includes CPU 6 and/or GPU 12.

Computing device 2 may include additional modules or units not shown in FIG. 1 for purposes of clarity. For example, computing device 2 may include a speaker and a microphone, neither of which are shown in FIG. 1, to effectuate telephonic communications in examples where computing device 2 is a mobile wireless telephone, or a speaker where computing device 2 is a media player. Computing device 2 may also include a video camera. Furthermore, the various modules and units shown in computing device 2 may not be necessary in every example of computing device 2. For example, user interface 4 and display 8 may be external to computing device 2 in examples where computing device 2 is a desktop computer or other device that is equipped to interface with an external user interface or display.

Examples of user interface 4 include, but are not limited to, a trackball, a mouse, a keyboard, and other types of input devices. User interface 4 may also be a touch screen and may be incorporated as a part of display 8. Transceiver module 3 may include circuitry to allow wireless or wired communication between computing device 2 and another device or a network. Transceiver module 3 may include modulators, demodulators, amplifiers and other such circuitry for wired or wireless communication.

Processor 6 may be a microprocessor, such as a central processing unit (CPU) configured to process instructions of a computer program for execution. Processor 6 may comprise a general-purpose or a special-purpose processor that controls operation of computing device 2. A user may provide input to computing device 2 to cause processor 6 to execute one or more software applications. The software applications that execute on processor 6 may include, for example, an operating system, a word processor application, an email application, a spreadsheet application, a media player application, a video game application, a graphical user interface application or another program. Additionally, processor 6 may execute GPU driver 22 for controlling the operation of GPU 12. The user may provide input to computing device 2 via one or more input devices (not shown) such as a keyboard, a mouse, a microphone, a touch pad or another input device that is coupled to computing device 2 via user input interface 4.

The software applications that execute on processor 6 may include one or more graphics rendering instructions that instruct processor 6 to cause the rendering of graphics data to display 8. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, an Open Computing Language (OpenCL™), RenderScript or any other heterogeneous computing APIs, or any other public or proprietary standard graphics or compute API. The software instructions may also be instructions directed towards renderless algorithms such as computational photography, convolution neural networks, video processing, scientific applications, and the like. In order to process the graphics rendering instructions, processor 6 may issue one or more graphics rendering commands to GPU 12 (e.g., through GPU driver 22) to cause GPU 12 to perform some or all of the rendering of the graphics data. In some examples, the graphics data to be rendered may include a list of graphics primitives, e.g., points, lines, triangles, quadrilaterals, triangle strips, etc.

GPU 12 may be configured to perform graphics operations to render one or more graphics primitives to display 8. Thus, when one of the software applications executing on processor 6 requires graphics processing, processor 6 may provide graphics commands and graphics data to GPU 12 for rendering to display 8. The graphics data may include, e.g., drawing commands, state information, primitive information, texture information, etc. GPU 12 may, in some instances, be built with a highly-parallel structure that provides more efficient processing of complex graphic-related operations than processor 6. For example, GPU 12 may include a plurality of processing elements, such as shader units, that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 8 more quickly than drawing the scenes directly to display 8 using processor 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. GPU 12 may include one or more processors, such as one or more microprocessors, application specific integrated circuits (ASICs), field programmable gate arrays (FPGAs), digital signal processors (DSPs), or other equivalent integrated or discrete logic circuitry. GPU 12 may also include one or more processor cores, so that GPU 12 may be referred to as a multi-core processor.

Graphics memory 40 may be part of GPU 12. Thus, GPU 12 may read data from and write data to graphics memory 40 without using a bus. In other words, GPU 12 may process data locally using a local storage, instead of off-chip memory. Such graphics memory 40 may be referred to as on-chip memory. This allows GPU 12 to operate in a more efficient manner by eliminating the need of GPU 12 to read and write data via a bus, which may experience heavy bus traffic. In some instances, however, GPU 12 may not include a separate memory, but instead utilize system memory 10 via a bus. Graphics memory 40 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

In some examples, GPU 12 may store a fully formed image in system memory 10. Display processor 14 may retrieve the image from system memory 10 and output values that cause the pixels of display 8 to illuminate to display the image. Display 8 may be the display of computing device 2 that displays the image content generated by GPU 12. Display 8 may be a liquid crystal display (LCD), an organic light emitting diode display (OLED), a cathode ray tube (CRT) display, a plasma display, or another type of display device.

Figure 2:
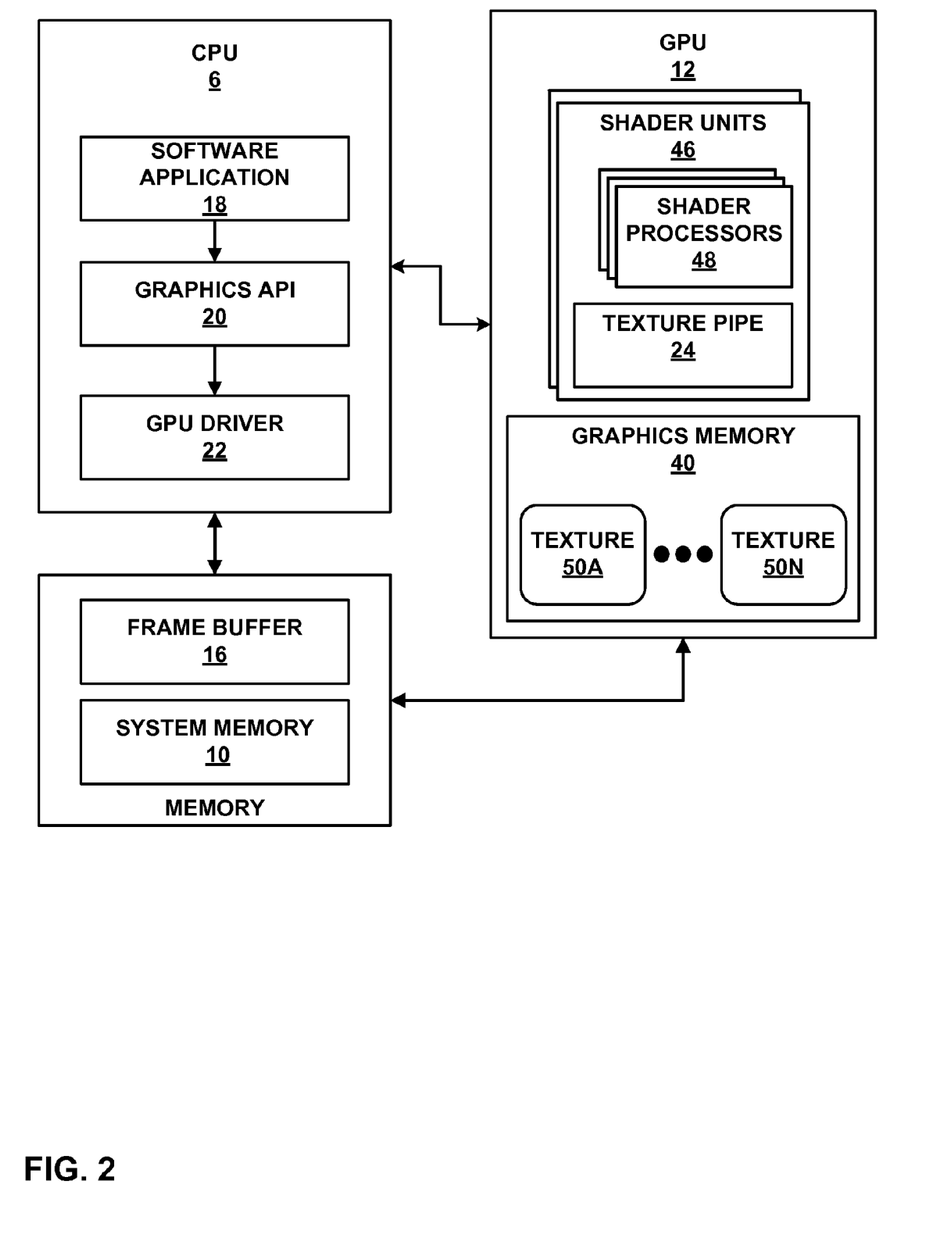
FIG. 2 is a block diagram illustrating example implementations of the processor, the GPU, and the system memory of FIG. 1.

FIG. 2 is a block diagram illustrating example implementations of processor 6, GPU 12, and system memory 10 of FIG. 1 in further detail. As shown in FIG. 2, processor 6 may execute at least one software application 18, graphics API 20, and GPU driver 22, each of which may be one or more software applications or services. In some examples graphics API 20 and GPU driver 22 may be implemented as hardware units of CPU 6.

Memory available to processor 6 and GPU 12 may include system memory 10 and frame buffer 16. Frame buffer 16 may be a part of system memory 10 or may be separate from system memory 10. Frame buffer 16 may store rendered image data.

Software application 18 may be any application that utilizes the functionality of GPU 12. For example, software application 18 may be a GUI application, an operating system, a portable mapping application, a computer-aided design program for engineering or artistic applications, a video game application, or another type of software application that uses 2D or 3D graphics.

Software application 18 may include one or more drawing instructions that instruct GPU 12 to render a graphical user interface (GUI) and/or a graphics scene. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 18 may invoke GPU driver 22, via graphics API 20, to issue one or more commands to GPU 12 for rendering one or more graphics primitives into displayable graphics images. For example, software application 18 may invoke GPU driver 22, via graphics API 20, to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like.

Based on the instructions issued by software application 18 to GPU driver 22, GPU driver 22 may formulate one or more commands that specify one or more operations for GPU 12 to perform in order to render the primitive. When GPU 12 receives a command from CPU 6, a graphics processing pipeline may execute on shader processors 48 to decode the command and to configure the graphics processing pipeline to perform the operation specified in the command. For example, an input-assembler in the graphics processing pipeline may read primitive data and assemble the data into primitives for use by the other graphics pipeline stages in a graphics processing pipeline. After performing the specified operations, the graphics processing pipeline outputs the rendered data to frame buffer 16 associated with a display device.

Frame buffer 16 stores destination pixels for GPU 12. Each destination pixel may be associated with a unique screen pixel location. In some examples, frame buffer 16 may store color components and a destination alpha value for each destination pixel. For example, frame buffer 16 may store Red, Green, Blue, Alpha (RGBA) components for each pixel where the "RGB" components correspond to color values and the "A" component corresponds to a destination alpha value. Although frame buffer 16 and system memory 10 are illustrated as being separate memory units, in other examples, frame buffer 16 may be part of system memory 10.

In some examples, a graphics processing pipeline may include one or more of a vertex shader stage, a hull shader stage, a domain shader stage, a geometry shader stage, and a pixel shader stage. These stages of the graphics processing pipeline may be considered shader stages. These shader stages may be implemented as one or more shader programs that execute on shader units 46 in GPU 12. Shader units 46 may be configured as a programmable pipeline of processing components. In some examples, shader unit 46 may be referred to as "shader processors" or "unified shaders," and may perform geometry, vertex, pixel, or other shading operations to render graphics. Shader units 46 may include shader processors 48, each of which may include one or more components for fetching and decoding operations, one or more ALUs for carrying out arithmetic calculations, one or more memories, caches, and registers.

GPU 12 may include texture pipe 24. In some examples, texture pipe 24 may be included in shader units 46, but it should be understood that, in other examples, texture pipe 24 may also be disposed outside of shader units 46. Texture pipe 24 may include one or more hardware units separate from shader processors 48 in GPU 12 that are configured to operate on one or more texture data, such as one or more of texture data 50A-50N ("texture data 50") stored in graphics memory 40 to perform texture operations, such as texture filtering, and to output the result of operating on the one or more texture data. Shader processors 48 may instruct texture pipe 24 to perform operations on texture data 50, and texture pipe 24 may send the results of operating on texture data 50 to shader processor 48 for further processing. For example, texture pipe 24 may be a dedicated set of hardware units that are dedicated to operating on texture data 50, such as dedicated to performing texture filtering on texture data or configured to calculate dot products of texture data and the like.

Each of texture data 50A-50N, for example, may be, but is not necessary limited to, a one-dimensional, two-dimensional, or three-dimensional texture, or a one-dimensional, two-dimensional, or three-dimensional array of texture. In some examples, a texture may be an object that contains one or more images, where pixels of the one or more images may be referred to as texels. Texture data 50 may include multiple textures (e.g., textures 50A, 50B, etc.). In one example, a texture data (e.g., texture data 50A) of texture data 50 may include an array of texture elements, also known as texels, which contain color and alpha values for the texture data. In some example, a texture data (e.g., texture data 50A) of texture data may include one or more quads, which may be a block of four texels.

In some examples, each texture data of texture data 50 may be a two-dimensional image that GPU 12 maps to three-dimensional graphics. For instance, a pixel in a texture data (e.g., texture data 50A), also referred to as a texel, may be identified by a (u, v) coordinate, and a texture data (e.g., texture data 50A) may be made up of an array of texels. In some examples, GPU 12 may map the (u, v) coordinates of the array of texels of a texture data (e.g., texture data 50A) to (x, y, z, w) coordinates. GPU 12 may also perform additional graphics processing on the texels of a texture data (e.g., texture data 50A) (e.g., additional graphics processing on the red-green-blue (RGB) values of the texels). In some examples, a block may include one or more texels, so that a texture may include multiple blocks that each includes one or more texels. In some examples, a block may include a quad, which may be a block of four texels.

GPU 12 may designate shader units 46 to perform a variety of shading operations such as vertex shading, hull shading, domain shading, geometry shading, pixel shading, and the like by sending commands to shader units 46 to execute one or more of a vertex shader stage, a hull shader stage, a domain shader stage, a geometry shader stage, and a pixel shader stage in a graphics processing pipeline. In some examples, GPU driver 22 may include a compiler configured to compile one or more shader programs, and to download the compiled shader programs onto one or more programmable shader units contained within GPU 12. The shader programs may be written in a high level shading language, such as, e.g., an OpenGL Shading Language (GLSL), a High Level Shading Language (HLSL), a C for Graphics (Cg) shading language, an OpenCL C kernel, etc. The compiled shader programs may include one or more instructions that control the operation of shader units 46 within GPU 12. For example, the shader programs may include vertex shader programs that may be executed by shader units 46 to perform the functions of a vertex shader stage, hull shader programs that may be executed by shader units 46 to perform the functions of a hull shader stage, domain shader programs that may be executed by shader unit 46 to perform the functions of a domain shader stage, geometry shader programs that may be executed by shader unit 46 to perform the functions of a geometry shader stage and/or pixel shader programs that may be executed by shader units 46 to perform the functions of a pixel shader. A vertex shader program may control the execution of a programmable vertex shader unit or a unified shader unit, and include instructions that specify one or more per-vertex operations.

Graphics memory 40 is on-chip storage or memory that physically integrated into the integrated circuit of GPU 12. Because graphics memory 40 is on-chip, GPU 12 may be able to read values from or write values to graphics memory 40 more quickly than reading values from or writing values to system memory 10 via a system bus. Graphics memory 40 may store texture data 50. As described above, each of texture data 50 may comprise texture elements, also referred to as texels, which are the fundamental units of texture space.

As also discussed above, in some examples, shader units 46 may include shader processors 48 as well as texture pipe 24. Texture pipe 24 may operate concurrently with shader processors 48 to operate on texture data 50. For example, shader processor 48 may perform operations of a graphics pipeline while texture pipe 24 operates concurrently to operate on texture data 50. In another example, shader processor 48 may operate on some portion of texture data 50 that has already been previously processed by texture pipe 24 as texture pipe 24 concurrently operates on some other portion of texture data 50.

Shader processors 48 may offload work onto texture pipe 24, including sending operations to texture pipe 24 or programming texture pipe 24 to perform image processing operations, so that texture pipe 24 may operate on texture data 50 while shader processors 48 concurrently performs graphics rendering operations, and texture pipe 24 may send the result of the image processing operations on texture data 50, such as texels of texture data 50 that result from the processing by texture pipe 24, to shader processor 48. For example, shader processors 48 may execute shader programs to perform image processing on images and textures stored in graphics memory 40.

As part of performing image processing, the shader programs may include instructions to perform certain image processing operations which may be offloaded to texture pipe 24. For example, those instructions to perform image processing operations may include instructions to perform block-based operations as described throughout this disclosure. GPU 12, or components of GPU 12 such as a high level sequencer may determine, based on the instructions, that shader processors 48 may be able to offload those block-based operations to texture pipe 24, and may enable shader processors 48 to send to texture pipe 24 instructions to perform specified block-based operations on specified one or more texture data of texture data 50. In some examples, shader processors 48 may send instructions per quad (four texels) to texture pipe 24 to perform a block-based operation on the respective quad. Texture pipe 24 may, based on the instructions received from shader processors 48, retrieve the specified one or more texture data of texture data 50, perform the specified block-based operations on the specified one or more texture data of texture data 50, and return the results of performing the specified block-based operations to shader processors 48.

In this way, by offloading certain image processing operations onto texture pipe 24, shader processors 48 may save processing cycles by receiving texels and/or other graphics data from texture pipe 24 that have already been operated on by texture pipe 24. Furthermore, off-loading texture processing to texture pipe 24 may enable better scalability of shader units 46. In some examples, instead of sending processed texels to shader processor 48, texture pipe 24 may also access graphics memory 40 to store the results of the operations performed by texture pipe 24 into graphics memory 40, and shader processors 48 may be able to access the results stored in graphics memory 40.

Figure 3:
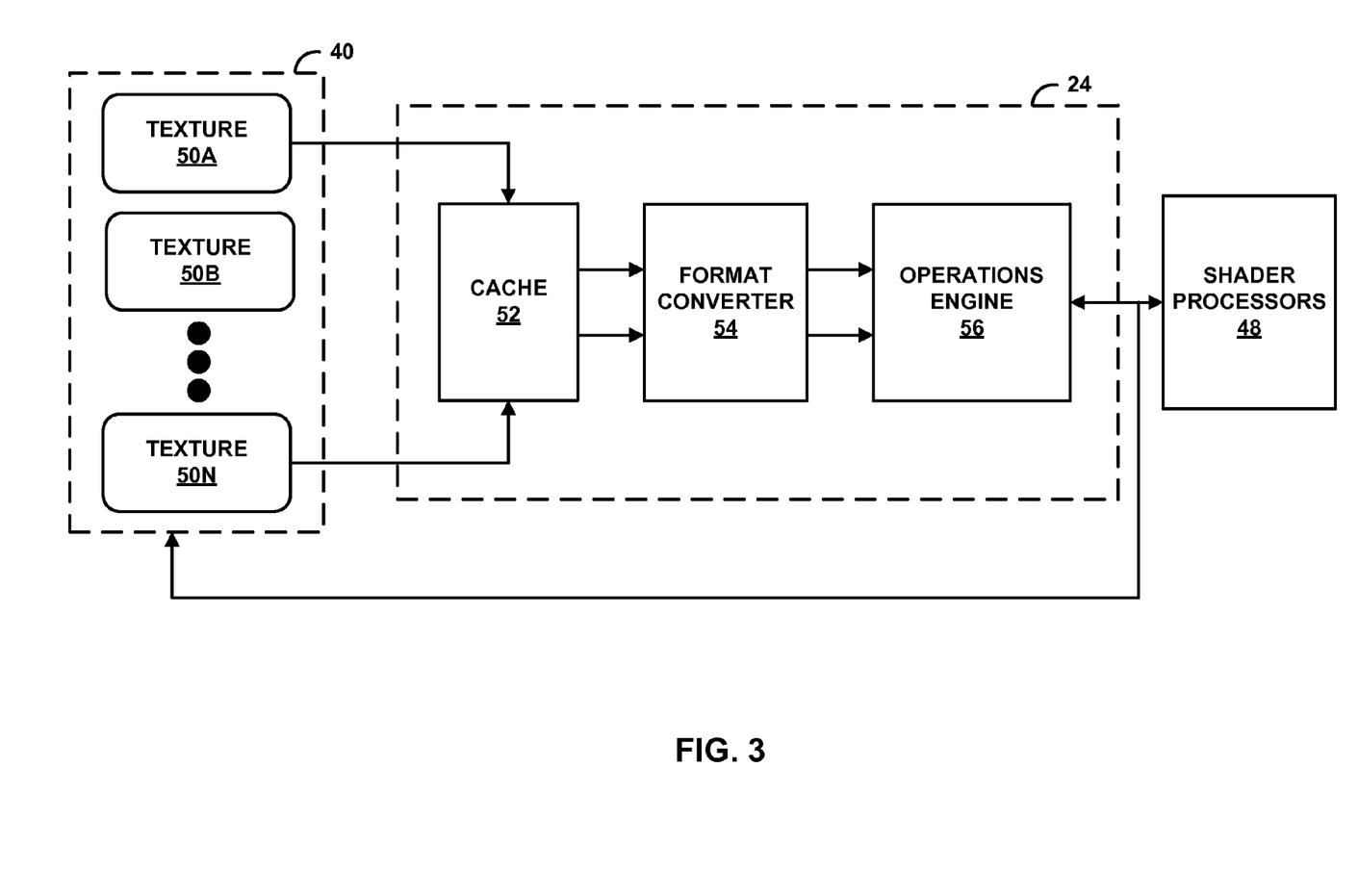
FIG. 3 is a block diagram illustrating the texture pipe of FIG. 2 in further detail.

FIG. 3 is a block diagram illustrating texture pipe 24 of FIG. 2 in further detail. Texture pipe 24, in some examples, may be quad-based, such that texture pipe 24 may read/cache/process or otherwise operate on sets of four texels at a time. For example, texture pipe 24 may perform an operation on two texture data (e.g., texture data 50A and 50B) that each include a quad (four texels), such that texture pipe 24 may operate on a total of eight texels at a time. A first texture data (e.g., texture data 50A) may differ in size from the second texture data (e.g., texture data 50B), such that the first and second texture data include different amount of texels. For example, the first texture data may include one quad of texels while the second texture data may include eight quads of texels.

As shown in FIG. 3, texture pipe 24 may include cache 52, which may be a level one (L1) cache, which may store texture data 50 retrieved from graphics memory 40. Cache 52 may be configured to store two or more texture data of texture data 50 (e.g., store two pieces of texture data 50A and 50B) retrieved from graphics memory 40 at the same. By storing two textures at the same time, cache 52 may enable texture pipe 24 to perform basic image processing operations between two pieces of texture data rather than limiting texture pipe 24 to performing dot products between a texture and a set of weights.

In some examples, one of the two or more pieces of texture data cached by cache 52 may comprise one or more convolution weights, such as a weight matrix, which may be cached in cache 52. Because some image processing algorithms performed by operations engine 56 may use the same block of texels (e.g., same quad of texels) over and over to process another block of texels, cache 52 may cache such blocks of texels, thereby more efficiently utilizing memory bandwidth. For example, texture pipe 24 may perform a block-matching operation, such as a sum of absolute difference operation or a sum of squared difference operation, to find the block of texels that best matches a given reference template within a pre-defined search area. In this example, texture pipe 24 may more efficiently utilize memory bandwidth by caching the reference block in cache 52 such that texture pipe 24 may compare the same reference block against a plurality of different blocks to determine whether a particular block of the plurality of different blocks matches the reference block.

Texture pipe 24 may also include format converter 54, which may convert the format of the texels of texture data 50. For example, format converter 54 may convert between one or more of 16-bit floating point textures, 32-bit floating point textures, signed normalized integer textures, unsigned normalized integer textures, red green blue alpha (RGBA) color space, red green blue (RGB) color space, red green (RG) color space, red (R) color space, YUV color space, and the like. Format converter 54 may also decompress texture data 50 compressed via compression schemes such as adaptive scalable texture compression (ASTC), BCx, ETCx, EACx, MIPI, and the like. In this way, format converter 54 may be able to decode image formats of texture data 50 before operations engine 56 processes the quads of texture data 50. As such, format converter 54 may be able to decode texture data before it is processed by operations engine 56.

In some examples, operations engine 56 may further include cache 55, which may be memory cache that caches the format-converted textures resulting from format converter 54. Texture pipe 24 may also include operations engine 56. Operations engine 56 may comprise one or more arithmetic logic units (ALUs) as well as other components that may perform one or more operations on texels of texture data 50. For example, the ALUs of operations engine 56 may perform arithmetic operations such as addition, subtraction, multiplication, and division, as well as bitwise operations, exponential operations, and the like on any set of texels of one or more texture data of texture data 50 in order to perform operations on texture data 50. Operations that operations engine 56 may perform on texture data 50 may include dot product operations, sum of absolute differences operations, sum of square differences operations, one-dimensional and two-dimensional convolution and correlation operations, image thresholding operations, determining areas of objects, block histogram, frame difference, frame addition, minimum or maximum of a block and the like. If operations engine 56 includes cache 55, operations engine 56 may retrieve the format-converted textures cached in cache 55 to perform on the retrieved format-converted textures one or more of the operations listed above.

Operations engine 56 may perform dot product operations on texture data 50. First texture data 50A and second texture data 50B may each include a block of texels, such as a quad of texels. A dot product operation may include multiplying each texel in first texture data 50A of second texture data 50B and summing the product of the texels from first texture data 50A of second texture data 50B. For example, if first texture data 50A includes texels $t_1$, $t_2$, $t_3$, and $t_4$, and if second texture data 50B includes texels $t_{11}$, $t_{12}$, $t_{13}$, and $t_{14}$, operations engine 56 may compute the dot product of first texture data 50A and second texture data 50B as $t_1*t_{11}+t_2*t_{12}+t_3*t_{13}+t_4*t_{14}$. The dot product operation may be useful, for example, for performing texture blending for adding shading to a geometry. Texture pipe 24 may output the result of performing the dot product operation of first texture data 50A and second texture data 50B to, for example, shader processors 48.

Operations engine 56 may also perform convolution and correlation operations on texture 50. A convolution operation may include multiplying each texel in first texture data 50A with weights included in second texture data 50B and summing the product of the texels and weights from the first and second texture data 50A and 50B. In this example, weights for performing the convolution can be stored as texture data that may be stored in graphics memory 40 and cached in cache 52. For example, if first texture data 50A includes texels $t_1$, $t_2$, $t_3$, and $t_4$, and if second texture data 50B includes weights $w_1$, $w_2$, $w_3$, and $w_4$, operations engine 56 may compute the two-dimensional convolution of first texture data 50A and second texture data 50B as $t_1*w_1+t_2*w_2+t_3*w_3+t_4*w_4$. First texture data 50A may differ in size and/or format from second texture data 50B that includes the weights for computing the convolution. In the example shown above, each texel of first texture data 50A may use a different convolution weight from second texture data 50B, such that operations engine 56 may perform per-pixel convolution on the texels of first texture data 50A. In another example, second texture data 50B may include convolution weights common to all texels of first texture data 50A, such that second texture data 50B can include weight $w_1$, and the convolution of first and second texture data 50A and 50B may be computed as $t_1*w_1+t_2*w_1+t_3*w_1+t_4*w_1$.

Texture pipe 24 may also perform several and different convolutions by selecting different textures stored in graphics memory 40. For example, given first, second, third, and fourth texture data 50A-50D of texture data 50, texture pipe 24 may select one of either the second texture data 50B, third texture data 50C, or fourth texture data 50D to use as weights with which to convolute first texture data 50A. Texture pipe 24 may select one of second texture data 50B, third texture data 50C, or fourth texture data 50D stored in graphics memory 40 to receive the selected texture data and store the selected texture data in cache 52. Operations engine 56 may then perform a convolution operation on first texture data 50A and the selected texture data. In this way, the weight for convolving a texture data of texture data 50 may pass from software application 18, via graphics API 20 and GPU driver 22 to graphics memory 40 as texture data that may be selected by texture pipe 24 from graphics memory 40 for use in performing a convolution operation without having to be received by texture pipe 24 from shader processors 48. The convolution operation may be useful for performing image filtering, such as BOX, Gaussian, edge detection, Laplacian, down-sampling, mean, high/low pass, correlation operations, and the like. The correlation operation may be useful for finding locations in an image that are similar to a template. Operations engine 56 may also perform one-dimensional convolution to produce two outputs: $t_1*w_1+t_2*w_2$ and $t_3*w_3+t_4*w_4$. Operations engine 56 may, in some examples, perform one-dimensional convolution faster than two-dimensional convolution.

In some examples, convolution weights may change at each pixel location as opposed to remaining constant for the entire image. In such an example, the convolution may not be arbitrary or random. Rather, the convolution weights may be selected from a list of pre-computed weights. These pre-computed weights may be of different dimensions and/or size. Two-dimensional arrays or three-dimensional textures may be used to define the pre-computed weight sets, and the two-dimensional array and/or the depth of the three-dimensional textures may be programmed to enable texture pipe 24 to select the requisite two-dimensional texture for the final convolution operation.

Operations engine 56 may also perform a sum of absolute differences (SAD) operation on first texture data 50A and second texture data 50B of texture data 50. The SAD operation may perform block-matching between two images or between a reference template-window and an image to measure the similarity between sets of texture data 50. Operations engine 56 may perform the SAD operation on first texture data 50A and second texture data 50B by taking the absolute difference between texels in first texture data 50A with corresponding texels in second texture data 50B, and summing the differences to create a simple metric of block similarity. The SAD operation may be used for a variety of purposes, such as object recognition, the generation of disparity maps for stereo images, motion estimation for video compression, and the like. In some examples, texture pipe 24 may increase the performance of performing the SAD operation by four times compared to shader processors 48. In one example, if first texture data 50A includes texels $t_1$, $t_2$, $t_3$, and $t_4$, and if second texture data 50B includes texels $t_{11}$, $t_{12}$, $t_{13}$, and $t_{14}$, operations engine 56 may compute the SAD of first texture data 50A and second texture data 50B as $|t_1-t_{11}|+|t_2-t_{12}|+|t_3-t_{13}|+|t_4-t_{14}|$.

Operations engine 56 may also perform a sum of square differences (SSD) operation on texture data 50. Similar to the SAD operation, the SSD operation may be another approach to perform block-matching between sets of texture data 50. Operations engine 56 may perform the SSD operation on first texture data 50A and second texture data 50B by taking the square of the difference between texels in first texture data 50A with corresponding texels in second texture data 50B, and summing the differences to create a simple metric of block similarity. Similar to the SAD operation, the SSD operation may also be used for a variety of purposes, such as object recognition, the generation of disparity maps for stereo images, motion estimation for video compression, and the like. In some examples, texture pipe 24 may increase the performance of performing the SSD operation by four times compared to shader processors 48. In one example, if first texture data 50A includes texels $t_1$, $t_2$, $t_3$, and $t_4$, and if second texture data 50B includes texels $t_{11}$, $t_{12}$, $t_{13}$, and $t_{14}$, operations engine 56 may compute the SSD of first texture data 50A and the second texture data 50B as $(t_1-t_{11})^2+(t_2-t_{12})^2+(t_3-t_{13})^2+(t_4-t_{14})^2$.

Operations engine 56 may also determine the area of an object by counting all the pixels contained in the object. For example, given a texture data in texture data 50 (e.g., texture data 50A), operations engine 56 may sum all of the pixels in texture data 50A. In some examples, operations engine 56 may pre-process texture data 50A by performing image thresholding on texture data (50A) so each texel may be either 0 or 1.

Operations engine 56 may also perform image thresholding on a texture data in texture data 50 (e.g., texture data 50A). Texture pipe 24 may receive a constant, such as from shader processors 48. Operations engine 56 may determine, for each texel in texture data 50A, whether the value of the texel is larger than the constant. For each texel, the operations engine 56 may output the value of the texel if the value of the texel is larger than the constant, or the operations engine 56 may output 0 if the value of the texel is not larger than the constant.

Texture pipe 24 may be able to output more than one result of operations engine 56 based at least in part on the image processing algorithm performed by texture pipe 24. For example, if texture pipe 24 combines all texels of a texture data of texture data 50 using certain operations, such as a two-dimensional convolution operation, texture pipe 24 may output a single two-dimensional convolution output. If texture pipe 24 combines row-wise texels using certain operations, such as a one-dimensional convolution operation, texture pipe 24 may output two one-dimensional convolution outputs. If texture pipe 24 combines pairwise texels using certain operations, such as frame image difference operations, texture pipe 24 may output four frame difference outputs.

As shown above, operations engine 56 may be used by texture pipe 24 to perform image filtering operations. Besides performing image filtering operations, including the convolution, block matching, SAD, and correlation operations described above, texture pipe 24 may use operations engine 56 to perform many other operations. For example, if first texture data 50A includes texels $t_1$, $t_2$, $t_3$, and $t_4$, and if second texture data 50B includes texels $t_{11}$, $t_{12}$, $t_{13}$, and $t_{14}$, operations engine 56 may be configured to perform frame difference operations, such as by producing four outputs $t_1-t_{11}$, $t_2-t_{12}$, $t_3-t_{13}$, $t_4-t_{14}$ or to perform frame addition operations, such as by producing four outputs $t_1+t_{11}$, $t_2+t_{12}$, $t_3+t_{13}$, $t_4+t_{14}$. The frame difference operation may be useful for determining movement in a frame, detection of interested moving objects in a frame, tracking objects from frame to frame, analysis of object tracks for recognizing object behavior, and estimation the trajectory of objects.

In some examples, operations engine 56 may also be used by texture pipe 24 to perform simple blending operations. For example, if first texture data 50A includes texels $t_1$, $t_2$, $t_3$, and $t_4$, and if second texture data 50B includes texels $t_{11}$, $t_{12}$, $t_{13}$, and $t_{14}$, operations engine may produce texel1 blend, texel2 blend, texel3 blend, and texel4 blend. Some examples of these operations may include add, subtract, reverse subtract, minimum, and maximum operations.

Operations engine 56 may perform the addition operation to output $t1.rgb*t_1.alpha+t_{11}rgb*t_{11}alpha$=texel1 blend, $t_2.rgb*t_2.alpha+t_{12}.rgb*t_{12}.alpha$=texel2 blend, $t_3.rgb*t_3.alpha+t_{13}.rgb*t_{13}.alpha$=texel3 blend, and $t_4.rgb*t_4.alpha+t_{14}.rgb*t_{14}.alpha$=texel4 blend. Operations engine 56 may perform the subtraction operation to output $t1.rgb*t_1.alpha-t_{11}rgb*t_{11}alpha$=texel1 blend, $t_2.rgb*t_2.alpha-t_{12}.rgb*t_{12}.alpha$=texel2 blend, $t_3.rgb*t_3.alpha-t_{13}.rgb*t_{13}.alpha$=texel3 blend, and $t_4.rgb*t_4.alpha-t_{14}.rgb*t_{14}.alpha$=texel4 blend. Operations engine 56 may perform the reverse subtraction operation to output $t1.rgb*t_{11}alpha-t_{11}rgb*t_1.alpha$=texel1 blend, $t_2.rgb*t_{12}.alpha-t_{12}.rgb*t_2.alpha$=texel2 blend, $t_3.rgb*t_{13}.alpha-t_{13}.rgb*t_3.alpha$=texel3 blend, and $t_4.rgb*t_{14}.alpha-t_{14}.rgb*t_4.alpha$=texel4 blend. Operations engine 56 may perform the minimum operation to output min($t_1$.rgb*$t_1$.alpha, $t_{11}$rgb*$t_m$alpha)=texel1 blend, min ($t_2$.rgb*$t_2$.alpha, $t_{12}$.rgb*$t_{12}$.alpha)=texel2 blend, min ($t_3$.rgb*$t_3$.alpha, $t_{13}$.rgb*$t_{13}$.alpha)=texel3 blend, and min ($t_4$.rgb*$t_4$.alpha, $t_{14}$.rgb*$t_{14}$.alpha)=texel4 blend. Operations engine 56 may perform the maximum operation to output max($t_1$.rgb*$t_1$.alpha, $t_{11}$rgb*$t_{11}$.alpha)=texel1 blend, max ($t_2$.rgb*$t_2$.alpha, $t_{12}$.rgb*$t_{12}$.alpha)=texel2 blend, max ($t_3$.rgb*$t_3$.alpha, $t_{13}$.rgb*$t_{13}$.alpha)=texel3 blend, and max ($t_4$.rgb*$t_4$.alpha, $t_{14}$.rgb*$t_{14}$.alpha)=texel4 blend.

In some examples, operations engine 56 may also be used by texture pipe 24 to perform morphological operations, which may be image processing operations that process images based on shapes. In a morphological operation, the value of each pixel in the output image may be based on a comparison of the corresponding pixel in the input image with its neighbors. A morphological operation that is sensitive to specific shapes in the input image may be constructed by selecting the size and shape of the neighborhood. Some examples of these operations may include dilation operations and erosion operations. A dilation operation may add pixels to the boundaries of objects in an image, while an erosion operation may remove pixels on object boundaries. Operations engine 56 may perform a dilation operation on a texel of a texture data by determining the value of the output texel as the maximum value of all the texels in the input texel's neighborhood. Operations engine 56 may also perform an erosion operation by a texel of a texture data by determining the value of the output texel as the minimum value of all the texels in the input texel's neighborhood.

In some examples, operations engine 56 may also be used by texture pipe 24 to perform pixelwise logical operations. Some examples of these operations may include general operations such as relational operations (e.g., bigger than, smaller than, equal to), and operations, or operations, exclusive or operations, and the like. In some examples, pixelwise logical operations may include simple thresholding operations, as described above. In some examples, pixelwise logical operations may include per-pixel thresholding. For example, if first texture data 50A includes texels $t_1$, $t_2$, $t_3$, and $t_4$, and if second texture data 50B includes texels $t_{11}$, $t_{12}$, $t_{13}$, and $t_{14}$, operations engine 56 may perform per-pixel thresholding of first texture data 50A and first texture data 50B to output if($t_1$>$t_{11}$) $t_1$ else $t_{11}$, if($t_2$>$t_{12}$) $t_2$ else $t_{12}$, if($t_3$>$t_{13}$) $t_3$ else $t_{13}$, and if($t_4$>$t_{14}$) $t_4$ else $t_{14}$. Operations engine 56 may also perform an expanding operation of texture data 50A, which changes a pixel from 0 to 1 if any neighbors are 1, such that for $t_1$ if($t_2$ & 1) & ($t_3$ & 1) & ($t_4$ & 1) $t_1$ is set to 1 else 0. Operations engine 56 may also perform a shrinking operation of texture data 50A, which changes a pixel from 1 to 0 if any or all neighbors are 1, such that for $t_1$ if($t_2$|0) & ($t_3$|0) & ($t_4$|0), $t_1$ is set to 0 or else $t_1$ is set to 1. Thus, these pixelwise operations may be achieved by applying a logical operator (such as AND, OR, XOR) to each of the pixels in a quad with a mask. For example, given pixels in a quad: p00, p01, p10, and p11, and a mask: 1, 1, 1, 0), the new value of the pixels may be: p00=(p00 & 1), p01=(p01 & 1), p10=(p10 & 1), and p11=(p11 & 0). Shrinking operations, expanding operations, smoothing operations, and the like may be applied depending on the mask and the logical operator. Operations engine 56 may also be configured to perform any other pixel-wise logical operations.

In some examples, operations engine 56 may also be used by texture pipe 24 to perform geometric property operations. Some examples of these operations may include determining the size or area, determining a position, determining an orientation, determining an X projection, and determining a Y projection. Operations engine 56 may determine the size or area by determining the area of a quad in texture data 50A, which may be $t_1+t_2+t_3+t_4$. Operations engine 56 may determine an x projection by producing two outputs: $t_1+t_2=x_0$ projection and $t_3+t_4=x_1$ projection. Operations engine 56 may determine a Y projection by producing two outputs: $t_1+t_3=y_0$ projection and $t_2+t_4=y_1$ projection.

In some examples, operations engine 56 may also be used by texture pipe 24 to perform histogram operations. For example, operations engine 56 may perform a quad histogram operation on four texels $t_1$, $t_2$, $t_3$, and $t_4$ of each of a plurality textures of texture data 50, such that count[$t_1$]++, count[$t_2$]++, count[$t_3$]++, and count[$t_4$]++ produces four output pairs: value1 and count1, value2 and count2, value3 and count3, and value4 and count4.

In addition to the operations described above, texture pipe 24 is not necessarily limited to performing the operations described above. Techniques of the present disclosure may similarly be applied such that texture pipe 24 may also perform any other operations related to image processing, video post-processing, camera image processing, computer vision, and the like. Furthermore, although the above examples include four texel-by-four texel examples, operations engine 56 may, in some examples, be usable to perform the operations disclosed herein for up to N×N block operations, where N may be any positive integer. For example, operations engine 56 may be usable to perform 8×8 block operations, 32×32 block operations, and the like. For example, texture pipe 24 may accumulate 2×2 partial results and return the partial results to shader processor 48. It should also be understood that image blocks may be rectangular, such as in an M*N arrangement (e.g., 32×16, 8×3, 11×12, and the like).

Figure 4:
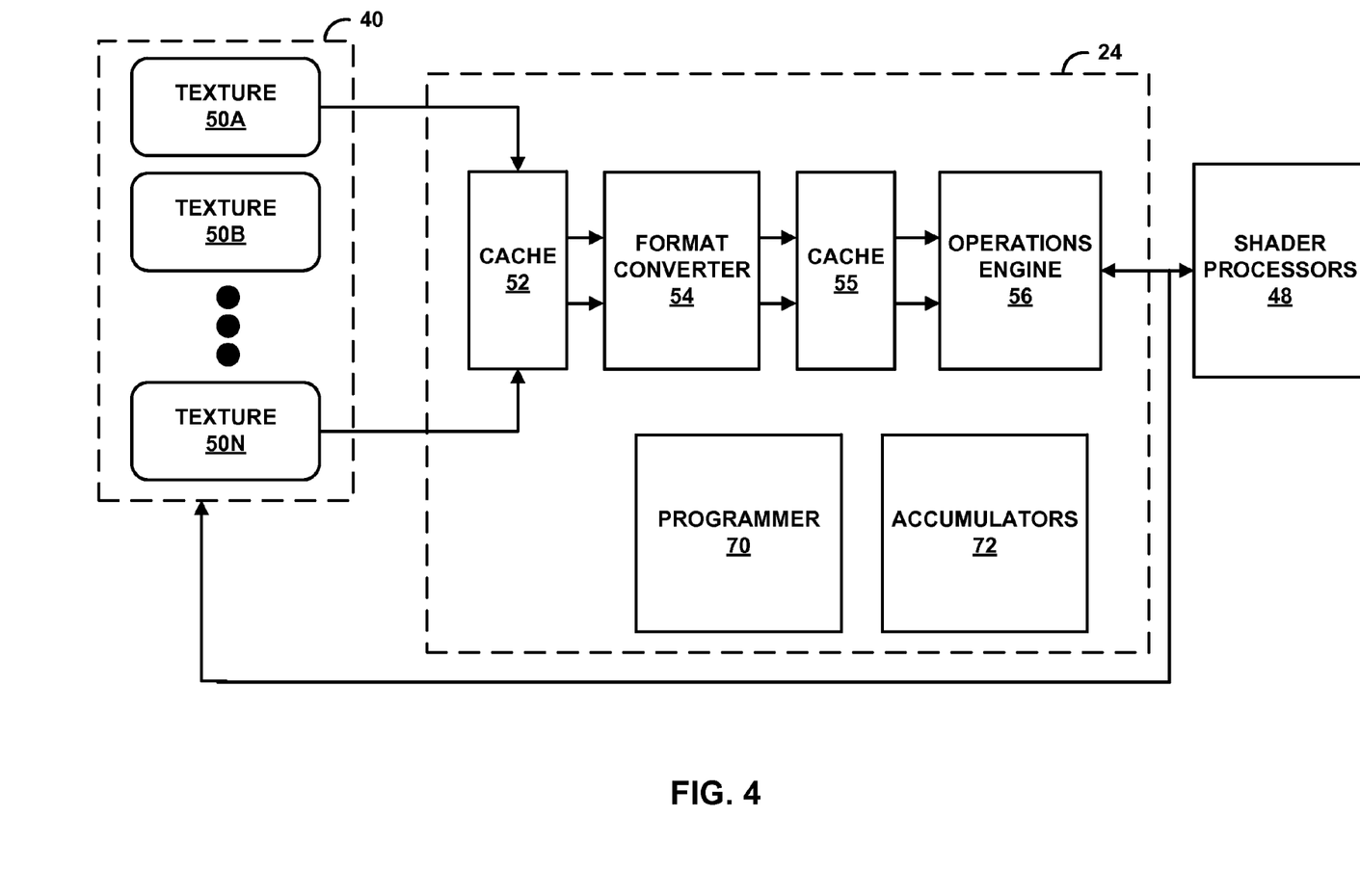
FIG. 4 is a block diagram illustrating the texture pipe of FIG. 3 that may act as an image processing engine.

FIG. 4 is a block diagram illustrating texture pipe 24 of FIG. 3 that may act as an image engine. As shown in FIG. 4, texture pipe 24 may include texture pipe programmer 70 and accumulators 72. Shader processors 48 may be able to program texture pipe 24 with start/end texture data 50 coordinates and offsets, and texture pipe programmer 70 may store the instructions from shader processors 48 and may program texture 24 based on the programming from shader processors 48. Texture pipe programmer 70 may also program texture pipe 24 to traverse/loop through each texture data of texture data 50. Texture pipe programmer 70 may also receive instructions from CPU 6, via GPU driver 22, and may program texture pipe 24 based on the received instructions. Texture pipe 24 may also include accumulators 72 to store partial (e.g., per quad) results outputted by operations engine 56. Texture pipe 24 may be able to write the result of operations performed by operations engine 56 directly to memory, such as graphics memory 40, in addition to being able to output the results to shader processors 48, thereby being able to bypass shader processors 48. By acting as a processing engine, shader processors 48 may instruct texture pipe 24 to perform an image processing operation between two images (e.g., perform two dimensional convolution between two blocks of the respective two images) and in the meantime the shader processors 48 may be able to concurrently perform other tasks such as processing texels of other texel data outputted from texture pipe 24 to shader processors 48 while texture pipe 24 performs the image processing operation. Texture pipe 24 may output the results of performing the image processing operation to shader processors 48 for further processing.

Figure 5:
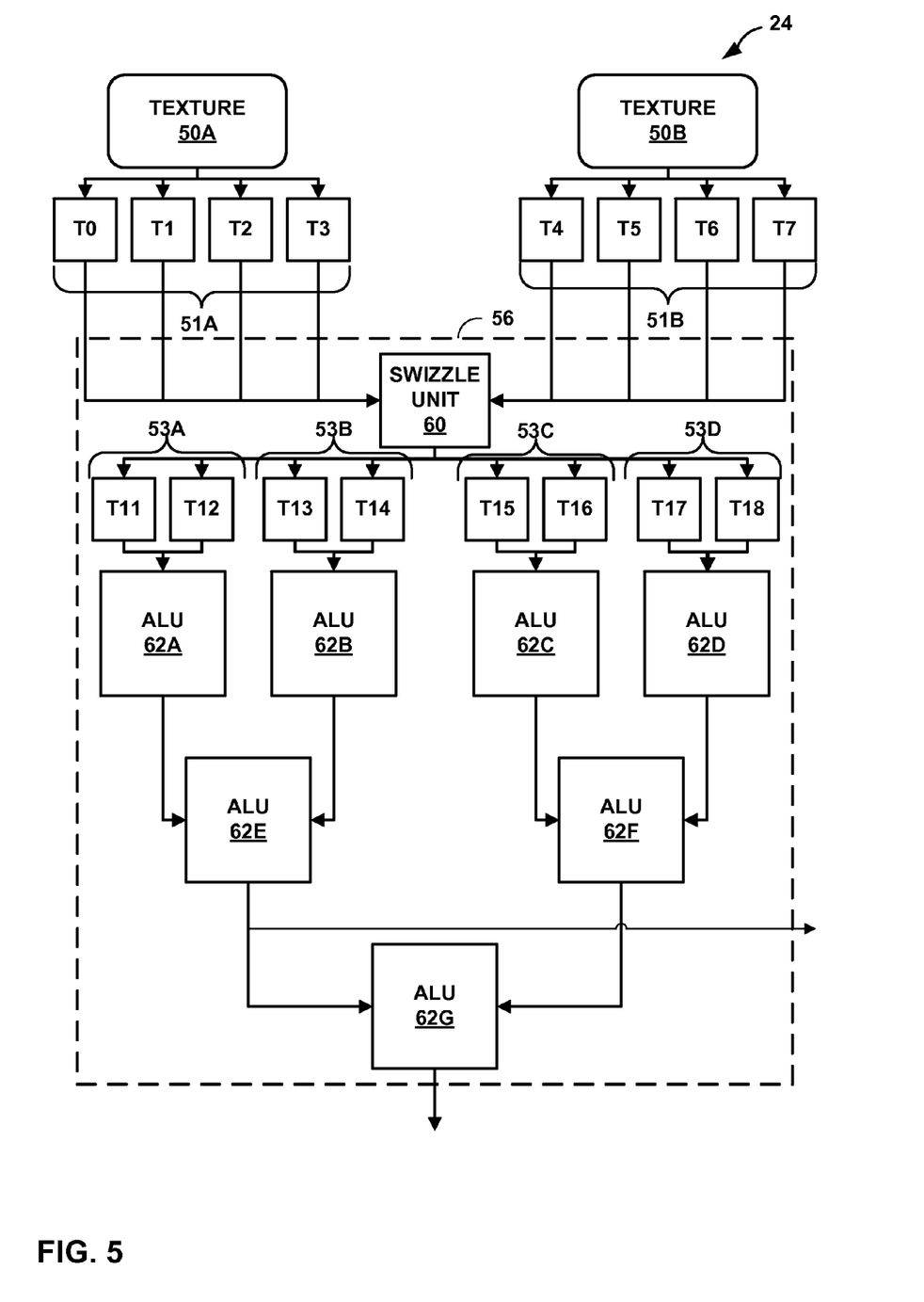
FIG. 5 is a block diagram illustrating additional details of the operations engine of the texture pipe of FIG. 3 and FIG. 4.

FIG. 5 is a block diagram illustrating additional details of operations engine 56 of texture pipe 24 of FIG. 3 and FIG. 4. As shown in FIG. 5, texture data 50A may include texels 51A, and texture data 50B may include texels 51B. As discussed above, texture data 50A and 50B may be stored in cache 52 in texture pipe 24, and format converter 54 may convert the format of texels 51A and 51B into the appropriate format for processing by operations engine 56. Operations engine 56 may include swizzle unit 60 that may swizzle texels 51A and 51B so that operations engine 56 may operate on the appropriate pairs of texels out of texels 51A and 51B. Therefore, swizzle unit 60 may improve the reconfigurability of operations engine 56 for performing a variety of operations. For example, if operations engine 56 is performing a convolution operation on texture data 50A and 50B, swizzle unit 60 may swizzle texels 51A so that texel $t_1$ from texels 51A is paired with weight $w_1$ from texels 51B, texel $t_2$ is paired with weight $w_2$ from texels 51B, texel $t_3$ from texels 51A is paired with weight $w_3$ from texels 51B, and texel $t_4$ from texels 51A is paired with weight $w_4$ from texels 51B.

Operations engine 56 may further include ALUs 62A-26G ("ALUs 62") for performing operations such as addition, subtraction, multiplication, division, bitwise operations (e.g., AND operations or OR operations), exponential operations, greater than operations, lesser than operations, equals to operations, and the like on texels 51A and 51B. For example, if operations engine 56 is performing a convolution operation on texture data 50A and 50B, ALU 62A may multiply texel $t_1$ from texels 51A with weight $w_1$ from texels 51B, ALU 62B may multiply texel $t_2$ with weight $w_2$ from texels 51B, ALU 62C may multiply texel $t_3$ from texels 51A with weight $w_3$ from texels 51B, and ALU 62D may multiply texel $t_4$ from texels 51A with weight $w_4$ from texels 51B. ALU 62E may sum the result from ALUs 62A and 62B, and ALU 62F may sum the result from ALUs 62C and 62D. ALU 62 may sum the result from ALUs 62E and 62F to produce the result of convoluting texture data 50A with texture data 50E. As discussed above, in some examples, texture pipe 24 may send the result from operations engine 56 to shader processors 48. In some other examples, texture pipe 24 may store the result from operations engine 56 into graphics memory 40. If texture pipe 24 outputs four results, those four results may be the results output from ALUs 62A-62D. If texture pipe 24 outputs two results, those two results may be the results output from ALUs 62E and 62F. If texture pipe 24 outputs a single result, that result may be the result output from ALU 62G.

The following is application-level sample code written in OpenCL for setting up textures, sending data to texture memory, passing parameters to the kernel, and calling the kernel:

```
// Setup input format for image and weights/window/or generic second
texture
cl_image_format fmt_img1 = { CL_R, CL_UNSIGNED_INT8 }
cl_image_format fmt_img2 = { CL_R, CL_UNSIGNED_INT8 }
// Create input images
char data_img1[256*256] = { . . . } // input image
Char data_img2[5*5]     = { . . . } // weights, windows or generic
second image
// Create memory objects
cl_mem in_img1;
cl_mem in_img2;
clCreateImage2D( . . . , in_img1, . . . , &fmr_img1, 256, 256, NULL,
data_img1);
clCreateImage2D( . . . , in_img2, . . . , &fmr_img2, 5, 5, NULL,
data_img2);
// Set the arguments to our compute kernel
clSetKernelArg( . . . , 0, sizeof(cl_mem), &in_img1);
clSetKernelArg( . . . , 1, sizeof(cl_mem), &in_img2);
clSetKernelArg( . . . , 2, sizeof(cl_mem), &results);
```

The following is kernel-level sample code for executing a two-dimensional loop per pixel and performing convolution/SAD/SSD:

```
                      #define WIN_HEIGHT 5
#define WIN_WIDTH 5
___kernel void tex_naive_2Dalgorithm(___read_only image2d_t img,
                 ___read_only image2d_t win,
                 ___global uchar *results)
{
    sampler_t sampler = CLK_NORMALIZED_COORDS_FALSE |
CLK_ADDRESS_CLAMP_TO_EDG | CLK_FILTER_NEAREST;
    // Assuming one pixel per work-item then global_id are image
coordinates and global_size are imge size
    size_t img_x = get_global_id(0); size_t img_y =
get_global_id(1); size_t img_width= get_global_size(0)
    . . . check boundaries . . . init variables . . .
    for( size_t win_y = 0; win_y < WIN_HEIGHT ; win_y++ )
        for( size_t win_x = 0; win_x < WIN_WIDTH ; win_x++)
        {
            i = read_imageui( img, sampler, (int2)(img_x+win_x,
            img_y+win_y)); //
SAM DST, UV_COORD, T#, S#
            w = read_imageui( win, sampler, (int2)( win_x, win_y));
                // do CONV/SAD/SSD etc
                res += (i * w);         // CONV
                res += abs(i * w) // SAD
                res += (i*i – w*w) // SSD
        }
        results[mad24(img_y, img_width, img_x)] = res;
}
```

The following is kernel-level sample code for executing a two-dimensional loop per pixel and performing convolution/SAD/SSD via proposed new API extensions to OpenCL conv_imageui, sad_imageui, and ssd_imageui that may assist in taking advantage of the techniques of the present disclosure:

```
    for( size_t win_y = 0; win_y < WIN_HEIGHT ; win_y += 2 )
        for( size_t win_x = 0; win_x < WIN_WIDTH ; win_x += 2)
        {
            res += conv_imageui( img, win, sampler, sampler,
(int2)(img_x+win_x, img_y+win_y), (int2)(win_x, win_y));
            . . . or . . .
            res += sad_imageui( img, win, sampler, sampler,
(int2)(img_x+win_x, img_y+win_y), (int2)(win_x, win_y));
            . . . or . . .
            res += ssd_imageui( img, win, sampler, sampler,
(int2)(img_x+win_x, img_y+win_y), (int2)(win_x, win_y));
        }
        results[mad24(img_y, img_width, img_x)] = res;
}
```

Figure 6:
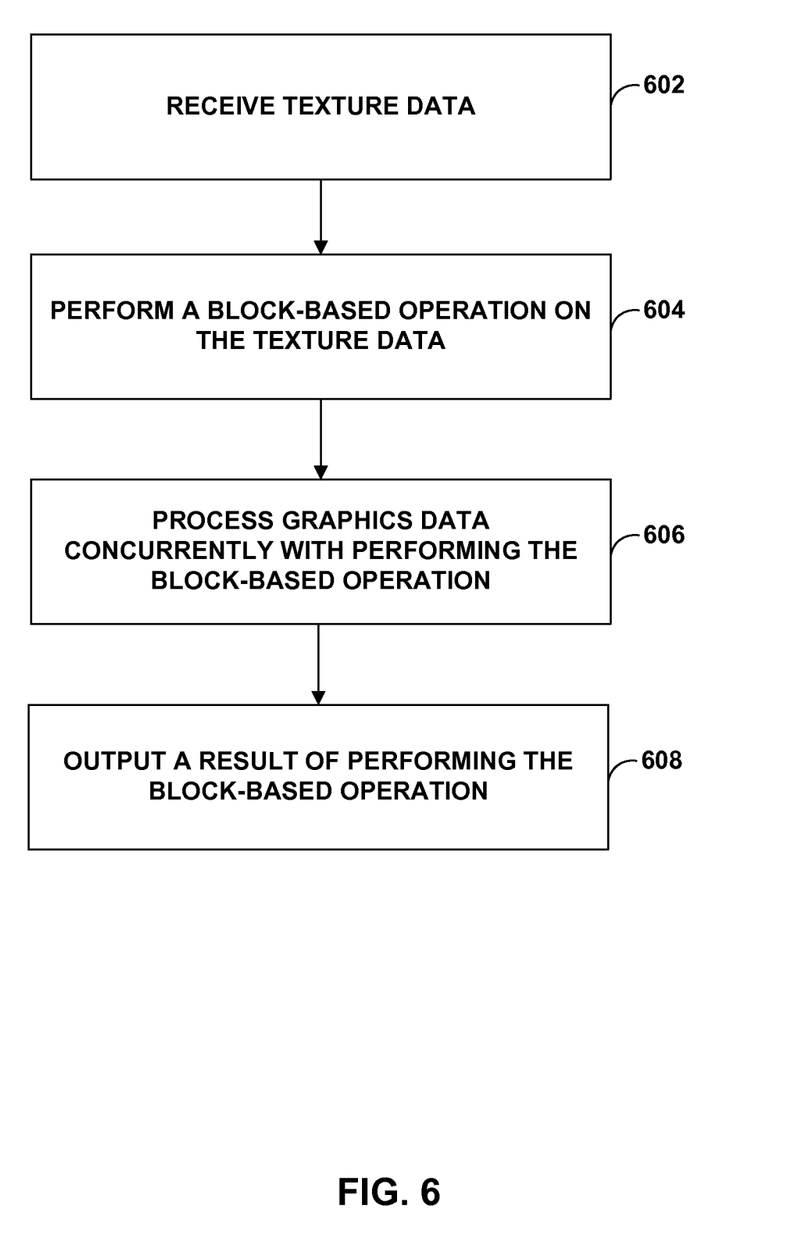
FIG. 6 is a flowchart illustrating a process for the texture pipe of FIG. 2, FIG. 3, and FIG. 4 to perform block-by-block image operations.

FIG. 6 is a flowchart illustrating a process for texture pipe 24 of FIG. 2, FIG. 3, and FIG. 4 to perform block-by-block image operations. As shown in FIG. 6, texture pipe 24 of GPU 12 may receive texture data 50 (602). Texture pipe 24 may perform a block-based operation on the texture data, wherein the texture data comprises one or more blocks of texels (604). In some examples, each block of the one or more blocks may be a portion less than a whole of the texture data. Shader processors 48 of GPU 12 may process graphics data concurrently with texture pipe 24 performing the block-based operation (606). Texture pipe 24 may output a result of performing the block-based operation on the texture data (608).

In some examples, texture data 50 may comprise a first texture data 50A and a second texture data 50B. In some examples, texture pipe 24 of GPU 12 receiving texture data 50 may include cache memory 52 of texture pipe 24 receiving first texture data 50A and second texture data 50B.

Cache memory 52 may store both first texture data 50A and second texture data 50B at the same time.

In some examples, texture pipe 24 may perform the block-based operation on texture data 50 by determining a sum of differences of first texture data 50A and second texture data 50B. In some examples, texture pipe 24 may perform a block-based operation on texture data 50 by determining a sum of square differences of first texture data 50A and second texture data 50B.

In some examples, texture pipe 24 may perform a block-based operation on texture data 50 by convoluting first texture data with one or more convolution weights, wherein second texture data 50B may comprise the one or more convolution weights. In some examples, texture pipe 24 may convolute first texture data 50A with the one or more convolution weights by performing per-pixel convolution of first texture data 50A with the one or more convolution weights.

In some examples first texture data 50A may differ from second texture data 50B in at least one of size or format. In some examples, first texture data 50A may be of a first format and second texture data 50B may be of a second format, and texture pipe 24 may convert first texture data 50A from the first format to the second format.

In some examples, texture pipe 24 may perform a block-based operation on texture data 50 by determining an area of an object based at least in part on texture data 50. In some examples, texture pipe 24 may perform a block-based operation on texture data 50 by performing an image thresholding operation on texture data 50. In some examples, texture pipe 24 may perform a block-based operation on texture data 50 by performing a morphological operation on texture data 50.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" and "processing unit," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other embodiments are within the scope of the following claims.

The invention claimed is:

1. A method of processing graphics data, the method comprising:
  receiving, by a texture pipe of a graphics processing unit (GPU), texture data, wherein the texture data comprises first texture data and second texture data;
  performing, by the texture pipe, a block-based operation on the texture data, including performing, by the texture pipe, a swizzling operation on the texture data to pair off one or more blocks of texels in the texture data based at least in part on the block-based operation to be performed, and convoluting texels in the first texture data with convolution weights in the second texture data;
  processing graphics data with shader processors of the GPU concurrently with the texture pipe performing the block-based operation; and
  outputting, by the texture pipe, a result of performing the block-based operation on the texture data.

2. The method of claim 1, wherein the texture data further comprises a third texture data and a fourth texture data, and wherein receiving the texture data further comprises:
  receiving, by a cache memory of the texture pipe, the third texture data and the fourth texture data.

3. The method of claim 2, wherein performing, by the texture pipe, the block-based operation on the texture data further comprises:
  determining, by the texture pipe, a sum of absolute differences of the third texture data and the fourth texture data.

4. The method of claim 2, wherein performing, by the texture pipe, the block-based operation on the texture data further comprises:
  determining, by the texture pipe, a sum of square differences of the third texture data and the fourth texture data.

5. The method of claim 2, wherein:
  the third texture data differs from the fourth texture data in at least one of size or format.

6. The method of claim 5, wherein the third texture data is of a first format and the fourth texture data is of a second format, the method further comprising:
   converting, by the texture pipe, the third texture data from the first format to the second format.

7. The method of claim 2, wherein performing, by the texture pipe, the block-based operation on the texture data further comprises:
   performing, by the texture pipe, alpha blending of the third texture data with the fourth texture data, including multiplying a color value of at least a first texel in the third texture data with an alpha value of at least a second texel in the fourth texture data.

8. The method of claim 1, wherein convoluting the texels in the first texture data with the convolution weights in the second texture data further comprises:
   performing, by the texture pipe, per-pixel convolution of the texels in the first texture data with the convolution weights.

9. The method of claim 1, wherein performing, by the texture pipe, the block-based operation on the texture data further comprises:
   determining, by the texture pipe, an area of an object based at least in part on the texture data.

10. The method of claim 1, wherein performing, by the texture pipe, the block-based operation on the texture data further comprises:
    performing, by the texture pipe, an image thresholding operation on the texture data.

11. The method of claim 1, wherein performing, by the texture pipe, the block-based operation on the texture data further comprises:
    performing, by the texture pipe, a morphological operation on the texture data.

12. The method of claim 1, wherein the number of texels in the first texture data is different from the number of convolution weights in the second texture data.

13. A computing device comprising:
    a memory configured to store texture data that comprises first texture data and second texture data;
    a texture pipe configured to:
       receive the texture data from the memory;
       perform a block-based operation on the texture data, including performing a swizzling operation on the texture data to pair off one or more blocks of texels in the texture data based at least in part on the block-based operation to be performed, and convoluting texels in the first texture data with convolution weights in the second texture data; and
       output a result of performing the one or more block-based operations on the one or more texture data; and
    shader processors configured to process graphics data concurrently with the texture pipe performing the block-based operation.

14. The computing device of claim 13, wherein:
    the texture data comprises a third texture data and a fourth texture data; and
    the texture pipe is further configured to receive the third texture data and the fourth texture data.

15. The computing device of claim 14, wherein the texture pipe is configured to:
    determine a sum of absolute differences of the third texture data and the fourth texture data.

16. The computing device of claim 14, wherein the texture pipe is configured to:
    determine a sum of square differences of the third texture data and the fourth texture data.

17. The computing device of claim 14, wherein:
    the third texture data differs from the fourth texture data in at least one of size or format.

18. The computing device of claim 17, wherein the third texture data is of a first format and the fourth texture data is of a second format, and wherein the texture pipe is further configured to:
    convert the third texture data from the first format to the second format.

19. The computing device of claim 13, wherein the texture pipe is further configured to: perform per-pixel convolution of the texels in the first texture data with the convolution weights in the second texture data.

20. The computing device of claim 13, wherein the texture pipe is further configured to:
    determine an area of an object based at least in part on the texture data.

21. The computing device of claim 13, wherein the texture pipe is further configured to:
    perform an image thresholding operation on the texture data.

22. The computing device of claim 13, wherein the texture pipe is further configured to:
    perform a morphological operation on the texture data.

23. A non-transitory computer-readable medium comprising instructions for causing a programmable processor to:
    receive, by a texture pipe of a GPU, texture data that comprises first texture data and second texture data;
    perform, by the texture pipe, a block-based operation on the texture data, including performing, by the texture pipe, a swizzling operation on the texture data to pair off one or more blocks of texels in the texture data based at least in part on the block-based operation to be performed, and convoluting texels in the first texture data with convolution weights in the second texture data;
    process graphics data with shader processors of the GPU concurrently with the texture pipe performing the block-based operation; and
    output, by the texture pipe, a result of performing the one or more block-based operations on the one or more texture data.

24. The non-transitory computer readable medium of claim 23, wherein the texture data comprises a third texture data and a fourth texture data, and wherein receive, by the texture pipe of the graphics processing unit (GPU), the texture data further comprises:
    receive, by a cache memory of the texture pipe, the third texture data and the fourth texture data.

25. The non-transitory computer readable medium of claim 24,
    determine, by the texture pipe, a sum of absolute differences of the third texture data and the fourth texture data.

26. The non-transitory computer readable medium of claim 24,
    determine, by the texture pipe, a sum of square differences of the third texture data and the fourth texture data.

27. An apparatus comprising:
    means for receiving texture data that includes first texture data and second texture data;
    means for performing a block-based operation on the texture data, including means for performing a swizzling operation on the texture data to pair off one or more blocks of texels in the texture data based at least in part on the block-based operation to be performed, and means for convoluting texels in the first texture data with convolution weights in the second texture data;

means for processing graphics data concurrently with the means for performing the block-based operation; and means for outputting a result of performing the block-based operation on the one or more texture data.

28. The apparatus of claim 27, wherein the texture data comprises a third texture data and a fourth texture data, and wherein the means for receiving the texture data further comprises means for receiving the third texture data and the fourth texture data.

29. The apparatus of claim 27, wherein the means for convoluting the texels in the first texture data with the convolution weights in the second texture data further comprises:

means for performing per-pixel convolution of the texels in the first texture data with the convolution weights in the second texture data.

* * * * *